United States Patent
Radhakrishnan (10) Patent No.: US 8,265,973 B2
(45) Date of Patent: Sep. 11, 2012

(54) ANALYTIC-BASED SCALING OF INFORMATION TECHNOLOGY RESOURCES

(75) Inventor: Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/722,010

(22) Filed: Mar. 11, 2010

(65) Prior Publication Data

US 2011/0225017 A1 Sep. 15, 2011

(51) Int. Cl.
*G06Q 40/00* (2006.01)
(52) U.S. Cl. ...................................... 705/7.11; 705/7.35
(58) Field of Classification Search ............. 705/7, 7.11, 705/7.35
See application file for complete search history.

(56) References Cited

U.S. PATENT DOCUMENTS

| | | | |
|---|---|---|---|
| 6,836,800 B1* | 12/2004 | Sweet et al. ................. | 709/224 |
| 7,346,676 B1 | 3/2008 | Swildens et al. | |
| 7,590,736 B2 | 9/2009 | Hydrie et al. | |
| 7,603,671 B2 | 10/2009 | Liu | |
| 2002/0152094 A1* | 10/2002 | Fahraeus ........................... | 705/1 |
| 2003/0191838 A1 | 10/2003 | Tsao | |
| 2004/0093247 A1* | 5/2004 | Baken .............................. | 705/7 |
| 2005/0044301 A1 | 2/2005 | Vasilevsky et al. | |
| 2006/0259680 A1 | 11/2006 | Chandrasekaran | |
| 2007/0168563 A1 | 7/2007 | Jha et al. | |

\* cited by examiner

*Primary Examiner* — Thomas Dixon
*Assistant Examiner* — Benjamin S Fields
(74) *Attorney, Agent, or Firm* — William E. Schiesser; Ronald A. D'Alessandro; Keohane & D'Alessandro PLLC (57) ABSTRACT

Embodiments of the present invention provide a solution for service-supporting resources (e.g., IT resources such as processor, storage, network, etc.). Specifically, the present invention will first create a resource configuration data repository that includes resource scaling capabilities of a set of IT resources. A unit of work data repository that includes details of jobs handled by the IT resources will also be included. Then, a profile will be created for the set of IT resources, the profile typically including information related to a service demand, a capacity, a utilization, and a performance of the set of IT resources. Resource utilization and performance data (e.g., historical and/or real-time data) will then be collected. Using the resource configuration data repository, the unit of work data repository, the profile, and the resource utilization and performance data, a scaling strategy will be generated/developed and implemented for the IT resources.

17 Claims, 4 Drawing Sheets

FIG. 4 ns; a bus coupled to the memory medium; a processor coupled to the bus that when executing the instructions causes the system to: identify a set of IT resources; create a resource configuration data repository that includes resource scaling capabilities of the set of IT resources; create a unit of work data repository which includes details of jobs handled by the set of IT resources; create a profile for the set of IT resources, the profile including information related to a service and resource demand, a capacity, a utilization and a performance of the set of IT resources; collect resource utilization and performance data for the set of IT resources; and generate a scaling strategy for the set of IT resources using the resource configuration data repository, the unit of work data repository, the profile, and the resource utilization and performance data.

ANALYTIC-BASED SCALING OF INFORMATION TECHNOLOGY RESOURCES

TECHNICAL FIELD

The present invention generally relates to resource scaling. Specifically, the present invention relates to analytic-based scaling of Information Technology (IT) resources (e.g., processor, storage, network, etc.).

BACKGROUND

In current computing environments, under-utilization of resources and/or resource outages can occur due to the inability of systems to dynamically scale and reconfigure in real-time basis in production. Current solutions focus on a single resource at a time (such as a logical disk) and its capability to scale up or down in real time based on the resource utilization. Among other things, current solutions do not adequately: factor in service contextual information such as service demand, potential or near term forecast of service demand, analysis of historical service demand/utilization data and its impact on resource utilization; account for all relevant units of work related to the service such as batch jobs, user initiated interactions, etc.; scale/tune all relevant resources in a coordinated and dynamic manner; and take a holistic view of all resources (dedicated and shared) that are supporting a service or application.

SUMMARY

In general, embodiments of the present invention provide a solution for service-supporting resources (e.g., IT resources such as processor, storage, network, etc.). Specifically, the present invention will first create a resource configuration data repository that includes resource scaling capabilities (e.g., dynamic scaling, automated aggregation, concurrent scaling needs of specific resources such as file system and database table space, storage zoning, and input/output multi-pathing, etc.) of a set of IT resources. A unit of work data repository that includes details of jobs handled by the IT resources will also be included. Then, a profile will be created for the set of IT resources. In a typical embodiment, the profile includes information related to a service demand, a capacity, a utilization and a performance of the set of IT resources. Resource utilization and performance data (e.g., historical and/or real-time data) will then be collected. Using the resource configuration data repository, the unit of work data repository, the profile, and the resource utilization and performance data, a scaling strategy will be generated/developed and implemented for the IT resources.

A first aspect of the present invention provides a method for IT resource scaling, comprising: identifying a set of IT resources; creating a resource configuration data repository that includes resource scaling capabilities of the set of IT resources; creating a unit of work data repository that includes details of jobs handled by the set of IT resources; creating a profile for the set of IT resources, the profile including information related to a service and resource demand, a capacity, a utilization and a performance of the set of IT resources; collecting resource utilization and performance data for the set of IT resources; and generating a scaling strategy for the set of IT resources using the resource configuration data repository, the unit of work data repository, the profile, and the resource utilization and performance data.

A second aspect of the present invention provides a system for IT resource scaling, comprising: a memory medium comprising instructions; a bus coupled to the memory medium; a processor coupled to the bus that when executing the instructions causes the system to: identify a set of IT resources; create a resource configuration data repository that includes resource scaling capabilities of the set of IT resources; create a unit of work data repository which includes details of jobs handled by the set of IT resources; create a profile for the set of IT resources, the profile including information related to a service and resource demand, a capacity, a utilization and a performance of the set of IT resources; collect resource utilization and performance data for the set of IT resources; and generate a scaling strategy for the set of IT resources using the resource configuration data repository, the unit of work data repository, the profile, and the resource utilization and performance data.

A third aspect of the present invention provides a computer readable medium containing a program product for IT resource scaling, the computer readable medium comprising program code for causing a computer: to identify a set of IT resources; create a resource configuration data repository that includes resource scaling capabilities of the set of IT resources; create a unit of work data repository that includes details of jobs handled by the set of IT resources; create a profile for the set of IT resources, the profile including information related to a service and resource demand, a capacity, a utilization and a performance of the set of IT resources; collect resource utilization and performance data for the set of IT resources; and generate a scaling strategy for the set of IT resources using the resource configuration data repository, the unit of work data repository, the profile, and the resource utilization and performance data.

A fourth aspect of the present invention provides a method for deploying an application for scaling IT resources, comprising: providing a computer infrastructure being operable to: identify a set of IT resources; create a resource configuration data repository that includes resource scaling capabilities of the set of IT resources; create a unit of work data repository which includes details of jobs handled by the set of IT resources; create a profile for the set of IT resources, the profile including information related to a service and resource demand, a capacity, a utilization and a performance of the set of IT resources; collect resource utilization and performance data for the set of IT resources; and generate a scaling strategy for the set of IT resources using the resource configuration data repository, the unit of work data repository, the profile, and the resource utilization and performance data.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For illustrative purposes, the Detailed Description has the following sections:

I. General Description
II. Computerized Implementation

I. General Description

As indicated above, embodiments of the present invention provide a solution for service-supporting resources (e.g., IT resources such as processor, storage, network, etc.). Specifically, the present invention will first create a resource configuration data repository that includes resource scaling capabilities (e.g., dynamic scaling, automated aggregation, concurrent scaling needs of specific resources such as file system and database table space, storage zoning, and input/output multi-pathing, etc.) of a set of IT resources. A unit of work data repository that includes details of jobs handled by the IT resources will also be included. Then, a profile will be created for the set of IT resources. In a typical embodiment, the profile includes information related a service demand, a capacity, a utilization and a performance of the set of IT resources. Resource utilization and performance data (e.g., historical and/or real-time data) will then be collected. Using the resource configuration data repository, the unit of work data repository, the profile, and the resource utilization and performance data, a scaling strategy will be generated/developed and implemented for the IT resources.

Figure 1:
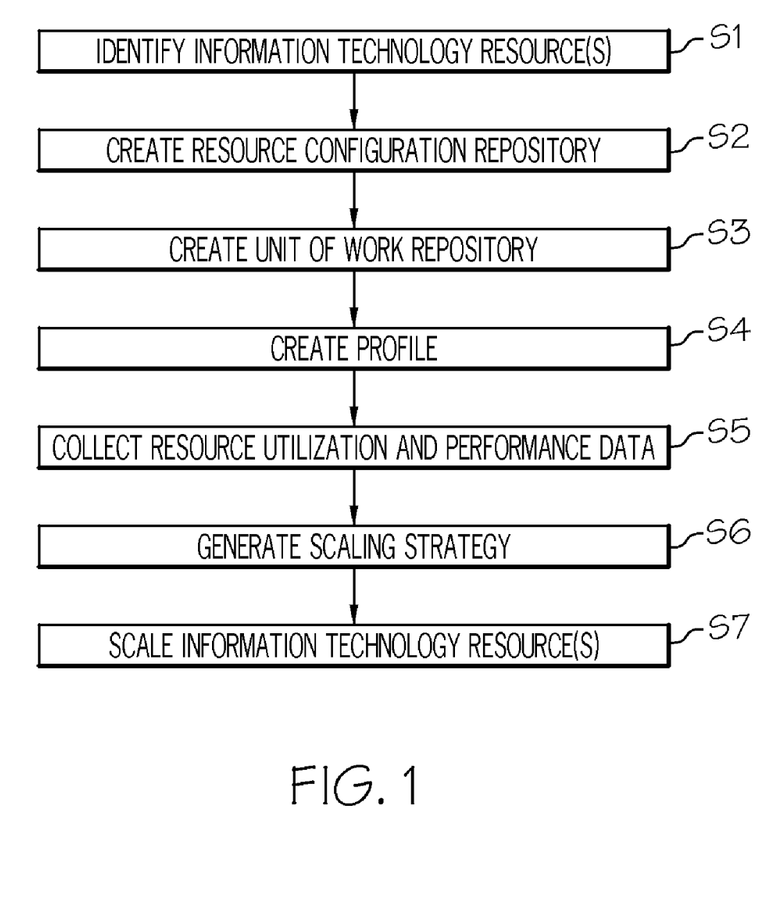
FIG. 1 depicts a method flow diagram in accordance with an embodiment of the present invention.

Referring now to FIG. 1, a method flow diagram according to an embodiment of the present invention is shown. As depicted, in step S1, a set (e.g., one or more) of service-supporting IT resources is identified and information pertaining thereto is collected. This can occur for dedicated and/or shared resources via any manner (e.g., automated discovery and dependency mapping tools, service related data flow, service traffic flow, service monitoring tools etc. In step S2, a service resource configuration data repository is created as part of a service scaling engine and typically included resource scaling capabilities (e.g., dynamic, autonomic, manual, automated, etc.). In step S3, a service related unit of work data repository is created. This repository will typically include information such as batch jobs, user initiated interactions, and deadline oriented application functionalities (e.g., staggered online university application deadlines), database jobs, event driven jobs such as replication jobs, administrator initiated jobs such as data migration, etc. Moreover, the unit of work repository maps these units of work to service related resource utilization information.

In step S4, a profile is created for the IT resource(s) that includes attributes such as service demand, capacity, utilization, and performance information and maps them to resource capacity, utilization, and performance information. In step S5, resource utilization, event, and/or performance data is collected (e.g., historically or in real time) using tools such as event and/or resource monitoring/management systems. Specifically, data is collected on service and service-related resource utilization and performance. Moreover, service utilization and performance patterns are correlated to resource utilization and performance patterns. Using the identified IT resources, the repositories, the profile and/or the collected data, a scaling strategy for the IT resources is developed in step S6, and implemented in step S7. Although not shown, notifications can be sent to user and administrators at or pertaining to any of these steps.

Thus, the development of the scaling strategy is fostered using real time, historical, and trend data associated with utilization, configuration data, models, correlation algorithms (including regression and other statistical tools), and streaming analytics. The resulting strategy allows resource scaling decisions to be made intelligently and timely. The implementation of the scaling strategy can be done using autonomic functions of the IT resource(s) themselves, or using external interfaces. Although not shown in FIG. 1, an embodiment of the present invention provides real-time notifications and justification (data) on scaling decisions and scaling information to relevant administrators, users and engineers.

Figure 2:
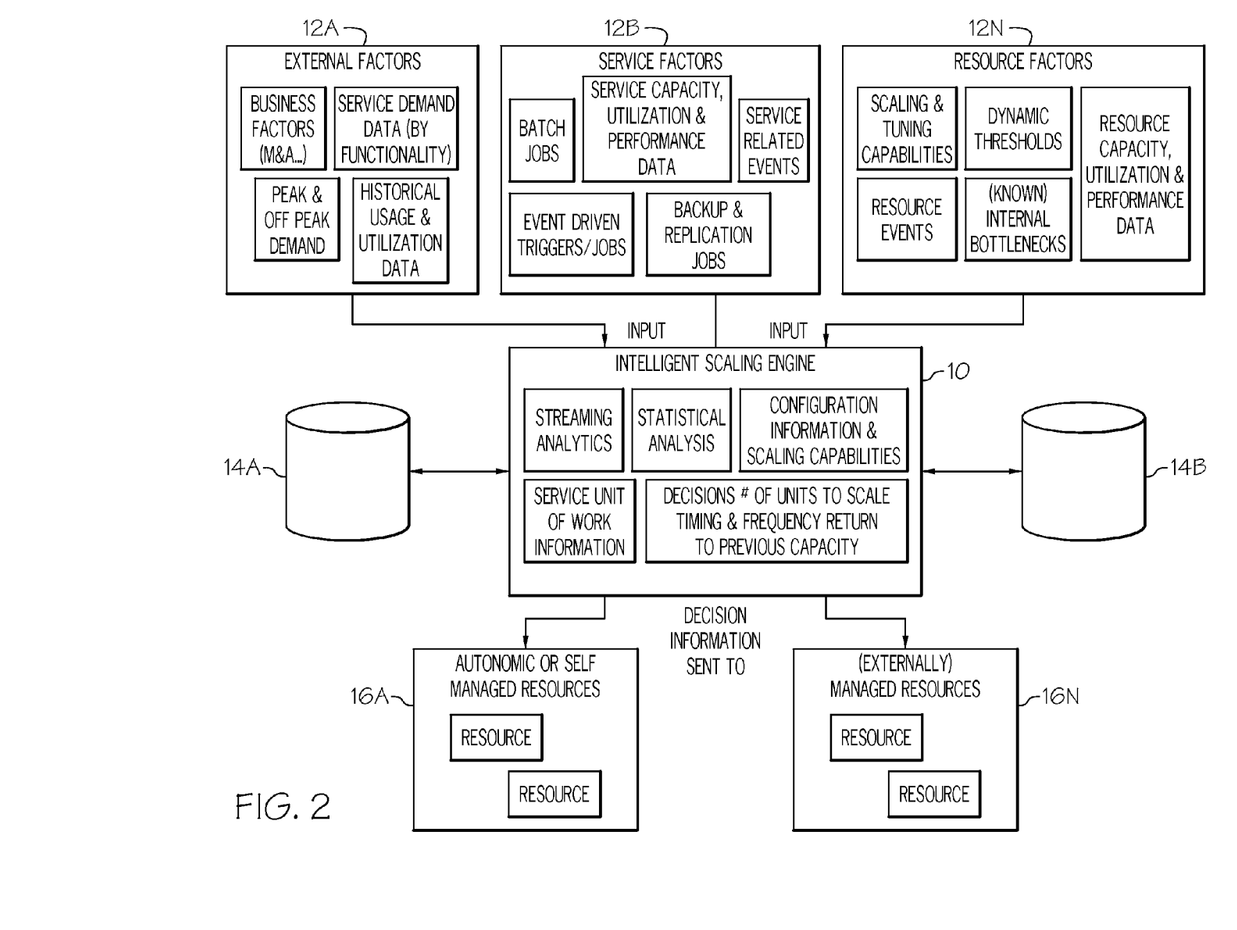
FIG. 2 depicts an architectural diagram in accordance with an embodiment of the present invention.
Figure 3:
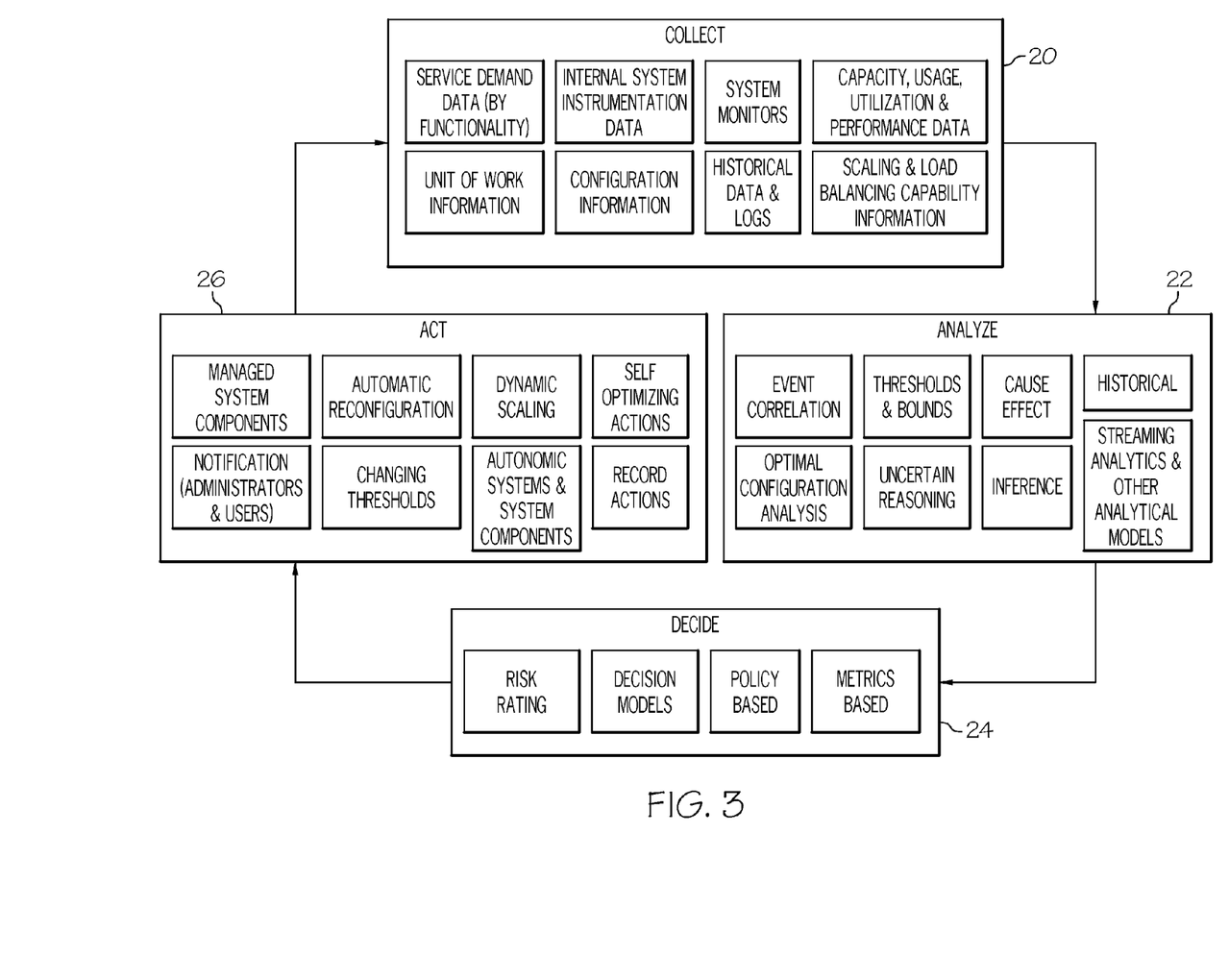
FIG. 3 depicts a process flow diagram in accordance with an embodiment of the present invention.

Referring now to FIGS. 2 and 3, these steps will be further explained in a more detailed fashion. In general, embodiments of the present invention provide real-time, integrated and holistic resource scaling based (among other things) on: real-time data and streaming analytic engines that capture service capacity, utilization and performance data, demand data (volume, type, etc.), work flow data, unit of work information, resource capacity, utilization and performance data, and/or configuration data. Embodiments recited herein analyze the same with historical and trend data and make intelligent decisions about automated, dynamic, proactive and real time scaling (up and down) of one or more (i.e., a set) of service related resources. Along these lines, embodiments of the present invention utilize virtualization, load balancing, aggregation, off-loading technologies and other technologies that enable dynamic scaling up or down of service resources.

Referring now to FIG. 2, an architectural diagram according to the present invention is shown. As depicted, resources such as autonomic IT resources 16A and/or externally managed IT resources 16N (collectively referred to as resources 16A-N) are scaled hereunder by intelligent scaling engine (hereinafter engine 10). Specifically, engine 10 performs or has performed all of the functions recited herein (e.g., as described in conjunction with the flow diagram of FIG. 1). Specifically, engine 10 will collect various pieces of information/data 12A-N some of which are grouped and shown (for illustrative purposes only) in FIG. 2. For example, engine will receive:

External factors 12A such as business factors, service demand data, peak and off-peak demand data, and historical usage and usage data;

Service factors 12B such as batch jobs, service capacity utilization and performance data, service related events, event driven triggers/jobs, and backup and replication jobs; and/or Resource factors 12N such as scaling and tuning capabilities, dynamic thresholds, resource capacity utilization and performance data, resource events, and known internal bottlenecks.

As this information is collected, a resource configuration repository 14A will be created for storing configuration information and scaling capabilities. In addition, a unit of unit of work data repository will be created for storing details of jobs handled by the resources 16A-N (e.g., service of unit work information). Using this information as well as streaming analytics, a profile will be created for resources 16A-N. In general, the profile will include information related to a service and resource demand, a capacity, and a utilization and performance of the resources 16A-N. Engine 10 will then generate a scaling strategy for the resources 16A-N using the resource configuration data repository, the unit of work data repository, the profile, and the resource utilization and performance data. The strategy could include, among other things, decisions regarding a number of units to scale, timing and frequency of jobs, changes in capacity such as a return to a previous capacity, etc. Regardless, the strategy will them be implemented (i.e., the set of resources 16A-N will be scaled) by the autonomic resources 16A themselves, or via an external interface (not shown) to externally manage resources 16N.

These concepts are further illustrated in conjunction with the process flow diagram of FIG. 3. As depicted, four types of steps are taken (or at least facilitated) hereunder by engine 10 (FIG. 2): collection 20, analysis 22, decision 24, and action 26. It should be understood that certain examples are shown within each step type for illustrative purposes only. In no way are those depicted in FIG. 3 intended to be exhaustive or limiting. In any event, collection 22 refers to the collection of information/data as described above. Examples shown includes service demand data, internal system instrumentation data, systems monitors, capacity usage and performance data, scaling and load balancing information, historical data and logs, configuration information, and/or unit of work information, etc. Analysis typically includes an analysis of: event correlation, thresholds and bounds, cause effect, historical data, optimal configuration, uncertain reasoning, inference, and/or streaming analytics, etc. Decision 24 typically involves: risk-rating decision models, policy-based decision making, and/or metric-based decision models, etc. Action 26 is where scaling decisions and supporting activities are implemented, such activities can include or pertain to: managed system components, automatic reconfiguration, dynamic scaling, self-optimizing actions, notifications to administrators and users, changing thresholds, autonomic systems and system components, and recording of actions.

Among other things, embodiments of the present invention provide the following functionality:

(1) The intelligent scaling engine solutions takes an end-to-end service view and factors in several service-related data such as service demand data, unit of work configuration data, service work flow data, resource dependency information, service configuration data, resource configuration data, service-resource dependency data, and service/resource utilization and performance relationship information, resource scalability and load balancing information, among others. The intelligent scaling engine uses contextual information and not just resource utilization information. Decisions are not made at the resource level, but rather at the service level. This point (and others) is further illustrated by the following scenarios:

Scenario 1:

Extent-based allocation of table space is done by a database (DB) engine based on current and potential demand for table space. This is a resource level decision made by the db server without contextual information or sharing of internal information. On the other hand, a Streaming Analytics-based Dynamic Scaling engine looks at the table space utilization data, as well as the reason for the growth in the specific table spaces (such as an Extract, Transform, Load (ETL) job, or turning up database logging level), and makes contextual and real-time decisions for table space scaling, as well as disk-space scaling and temporarily scaling swap space and virtual memory and Input/Output (IO) bandwidth, if relevant, thereby pushing decisions to the database server, storage enclosure, Server Operating System and Storage Area Network (SAN) virtualization engine to increase table space, Logical Unit Number (LUN) size and temporarily increase virtual memory and Fiber Channel (FC) SAN Zone Bandwidth during the time period when these additional capacities are needed.

Scenario 2:

The incremental service and service-related data backup job has failed during the last two backup windows, the problem has been fixed and the backup job is expected to be successful tonight. However, the backup job will likely run longer than usual as the three days of incremental backups need to be completed tonight. A streaming analytic-based dynamic scaling engine will be aware of these factors from the event monitoring and management systems (past two failures of back up jobs and increase in the size of the database supporting the service) and can make appropriate scaling decisions just before, during, and after the backup job—to ensure completion of the incremental back up job within the backup window—so that other production services do not get impacted due to the utilization of service resources by the backup job.

Scenario 3:

A private industry research funding group funds and directs research projects and their primary business application is an online research grant application and tracking system. It is historically, known that most of the online applications happen during the last week of the deadline for the research grant. Hence, the systems supporting these applications are configured for peak usage. However, with the intelligent scaling engine and analysis of current and historical data, resources can be scaled up and down and reused by other internal applications including number of virtual servers, network bandwidth, and SAN bandwidth, among others.

(2) Produces real time scaling decisions based on historical, current and real time data and information and streaming analytics.

(3) Takes real time dynamic scaling and tuning actions with the cooperation of relevant resources (self-managed or externally-managed resources).

(4) Provides real-time notification of scaling decisions and data associated with scaling decisions (reasoning for scaling decisions).

II. Computerized Implementation

Figure 4:
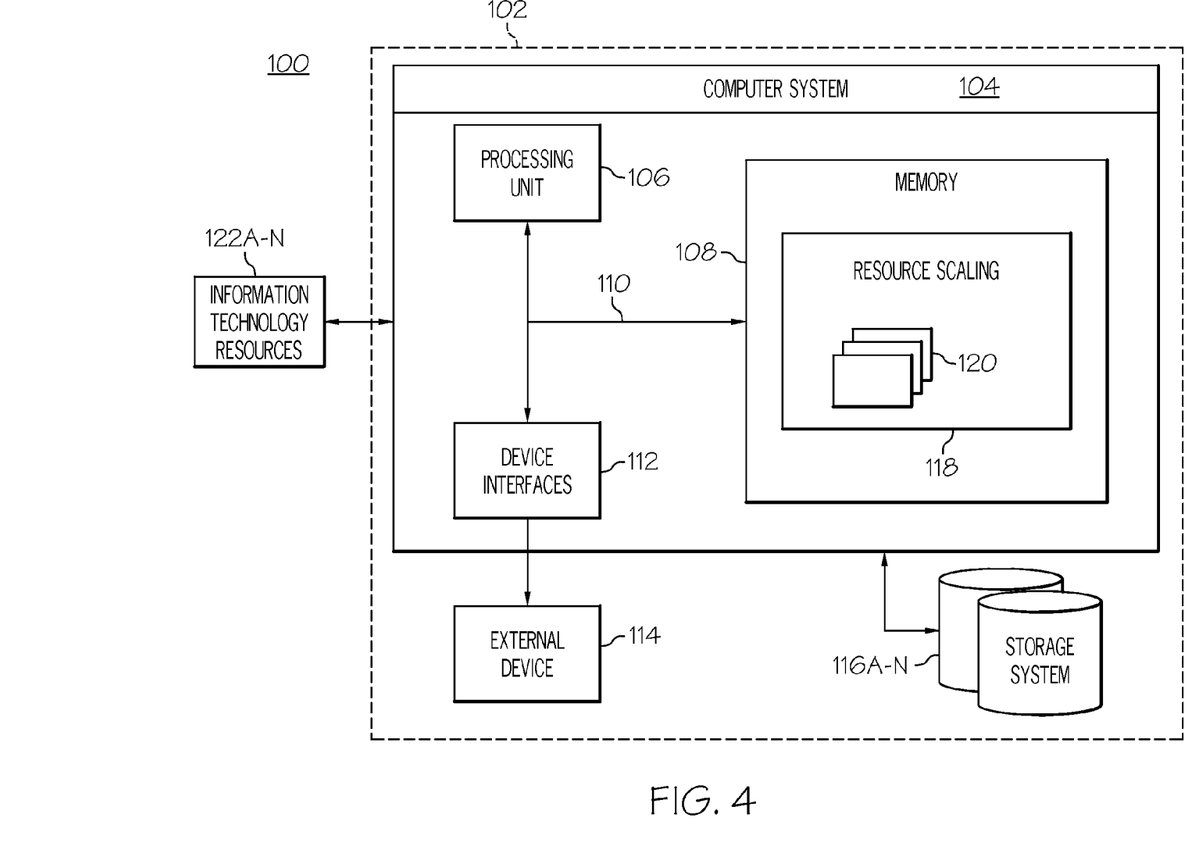
FIG. 4 depicts a more specific computerized implementation in accordance with an embodiment of the present invention.

Referring now to FIG. 4, a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and a device interfaces 112. Further, computer system 104 is shown having external devices 114 and storage system(s) 116A-N that communicate with bus 110 via device interfaces 112. In general, processing unit 106 executes computer program code, such as resource scaling software/program 118, which is stored in memory 108 and/or storage system(s) 116A-N. While executing computer program code, processing unit 106 can read and/or write data to/from memory 108, storage system(s) 116A-N, and/or device interfaces 112. Bus 110 provides a communication link between each of the components in computer system 104. Although not shown, computer system 104 could also include I/O interfaces that communicate with: one or more external devices such as a keyboard, a pointing device, a display, etc.; one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system(s) 116A-N can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 4 can be included in computer system 104.

Storage system(s) 116A-N can be any type of system capable of providing storage for information under the present invention. To this extent, storage system(s) 116A-N could include one or more storage devices, such as a magnetic disk drive or an optical disk drive. In another embodiment, storage system(s) 116A-N includes data distributed across, for example, a local area network (LAN), wide area network (WAN), or a storage area network (SAN) (not shown). In addition, although not shown, additional components, such as cache memory, communication systems, system software, etc., may be incorporated into computer system 104. Still yet, storage system 116A-N can represent repositories 14A-B of FIG. 2.

Shown in memory 108 of computer system 104 is resource scaling program 118 having a set of modules 120. The modules 120 generally provide the functions of the present invention as described herein. Specifically (among other things), set of modules 120 is configured to: identify a set of IT resources 122A-N; create a resource configuration data repository that includes resource scaling capabilities of the set of IT resources 122A-N; create a unit of work data repository that includes details of jobs handled by the IT resources; create a profile for the set of IT resources 122A-N, the profile including information related to a service and resource demand, a capacity, a utilization, and a performance of the set of IT resources 122A-N; collect resource utilization and performance data for the set of IT resources; generate a scaling strategy for the IT resources using the resource configuration data repository, the unit of work data repository, the profile, and the resource utilization and performance data for the set of IT resources; scale the IT resources based on the scaling strategy using at least one of the following: autonomic scaling capabilities of the IT resource, or an external interface; and/or generate reports based on the scaling.

While shown and described herein as an IT resource scaling solution, it is understood that the invention further provides various alternative embodiments. For example, in one embodiment, the invention provides a computer-readable/useable medium that includes computer program code to enable a computer infrastructure to provide a priority update solution. To this extent, the computer-readable/useable medium includes program code that implements each of the various process of the invention. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In another embodiment, the invention provides a method that performs the process of the invention on a subscription, advertising, and/or fee basis. That is, a service provider, such as a Solution Integrator, could offer to provide an IT resource scaling solution. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising.

In still another embodiment, the invention provides a computer-implemented method for IT resource scaling. In this case, a computer infrastructure, such as computer infrastructure 102 (FIG. 4), can be provided, and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 4), from a computer-readable medium; adding one or more computing devices to the computer infrastructure; and incorporating and/or modifying one or more existing systems of the computer infrastructure to enable the computer infrastructure to perform the process of the invention.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for Information Technology (IT) resource scaling, comprising: identifying a set of IT resources; creating a resource configuration data repository that includes resource scaling capabilities of the set of IT resources; creating a unit of work data repository that includes details of jobs handled by the set of IT resources; creating a profile for the set of IT resources, the profile including information related to a service and resource demand, a capacity, a utilization and a performance of the set of IT resources; collecting resource utilization and performance data for the set of IT resources; generating a scaling strategy for the set of IT resources based on analytics obtained using the resource configuration data repository, the unit of work data repository, the profile, and the resource utilization and performance data; and scaling the set of IT resources based on the scaling strategy using at least one of the following: autonomic scaling capabilities of the set of IT resource, or an external interface.

2. The method of claim 1, further comprising generating reports based on the scaling.

3. The method of claim 1, the set of IT resources supporting a service comprising at least one of the following: a storage system, a server, a network, middle-ware, a database, or application resources.

4. The method of claim 1, the profile mapping the set of IT resources to the information.

5. The method of claim 1, the resource utilization and performance data comprising historical data and real-time data.

6. A system for IT resource scaling, comprising: a memory medium comprising instructions; a bus coupled to the memory medium; a processor coupled to the bus that when executing the instructions causes the system to: identify a set of IT resources; create a resource configuration data repository that includes resource scaling capabilities of the set of IT resources; create a unit of work data repository that includes details of jobs handled by the set of IT resources; create a profile for the set of IT resources, the profile including information related to a service and resource demand, a capacity, a utilization and a performance of the set of IT resources; collect resource utilization and performance data for the set of IT resources; generate a scaling strategy for the set of IT resources based on analytics obtained using the resource configuration data repository, the unit of work data repository, the profile, and the resource utilization and performance data; and scale the set of IT resources based on the scaling strategy using at least one of the following: autonomic scaling capabilities of the set of IT resource, or an external interface.

7. The system of claim 6, the system further being caused to generate reports based on the scaling.

8. The system of claim 6, the set of IT resources being service-based resources.

9. The system of claim 6, the profile mapping the set of IT resources to the information.

10. The system of claim 6, the resource utilization and performance data comprising historical data and real-time data.

11. A computer readable medium containing a program product for IT resource scaling, the computer readable medium comprising program code for causing a computer to: identify a set of IT resources; create a resource configuration data repository that includes resource scaling capabilities of the set of IT resources; create a unit of work data repository that includes details of jobs handled by the set of IT resources; create a profile for the set of IT resources, the profile including information related to a service and resource demand, a capacity, a utilization and a performance of the set of IT resources; collect resource utilization and performance data for the set of IT resources; generate a scaling strategy for the set of IT resources based on analytics obtained using the resource configuration data repository, the unit of work data repository, the profile, and the resource utilization and performance data; and cause the computer to scale the set of IT resources based on the scaling strategy using at least one of the following: autonomic scaling capabilities of the set of IT resource, or an external interface.

12. The computer readable medium containing the program product of claim 11, the computer readable medium further comprising program code for causing the computer to generate reports based on the scaling.

13. The computer readable medium containing the program product of claim 11, the set of IT resources being service-based resources.

14. The computer readable medium containing the program product of claim 11, the profile mapping the set of IT resources to the information.

15. The computer readable medium containing the program product of claim 11, the resource utilization and performance data comprising historical data and real-time data.

16. A method for deploying an application for scaling IT resources, comprising:

providing a computer infrastructure being operable to:
  identify a set of IT resources;
  create a resource configuration data repository that includes resource scaling capabilities of the set of IT resources;
  create a unit of work data repository that includes details of jobs handled by the set of IT resources;
  create a profile for the set of IT resources, the profile including information related to a service and resource demand, a capacity, a utilization and a performance of the set of IT resources;
  collect resource utilization and performance data for the set of IT resources; and
  generate a scaling strategy for the set of IT resources based on analytics obtained using the resource configuration data repository, the unit of work data repository, the profile, and the resource utilization and performance data.

17. The method of claim 16, the computer infrastructure further being operable to scale the set of IT resources based on the scaling strategy.

* * * * *